United States Patent

[11] 3,547,098

| [72] | Inventor | William S. Lee |
| | | Bay Village, Ohio |
| [22] | Filed | Mar. 22, 1968 |
| [45] | Patented | Dec. 15, 1970 |
| [73] | Assignee | Ferro Corporation |
| | | Cleveland, Ohio |
| | | a corporation of Ohio |

[54] PORCELAIN ENAMELS FOR SELF-CLEANING COOKING OVEN
14 Claims, No Drawings

[52] U.S. Cl.................................................... 126/19,
117/129; 252/428
[51] Int. Cl............................................................ A21b 1/00
[50] Field of Search............................................ 126/19,
39M, 273; 252/428, (Inquired), 106, 117, 134

[56] References Cited
UNITED STATES PATENTS

| 3,271,322 | 9/1966 | Stiles............................ | 126/19X |
| 3,460,523 | 8/1969 | Stiles et al.................... | 126/19 |

*Primary Examiner*—Edward G. Favors
*Attorney*—Milton L. Simmons

ABSTRACT: A porcelain enamel frit containing a high level of an oxidation inducing metal oxide, preferably cobalt, adaptable to be incorporated into a vitreous porcelain enamel for application to an oven liner, said enamel characterized by the ability to completely oxidize oven soils when heated to a point above 350° F., but below 600° F., and method of utilizing same as a self-cleaning oven liner coating.

3,547,098

PORCELAIN ENAMELS FOR SELF-CLEANING COOKING OVEN

BACKGROUND OF THE INVENTION

The field of this invention may be described generally as residing in coatings for oven liners, and more particularly, to an improved porcelain enamel frit of such a composition that upon being incorporated into a porcelain enamel coating and applied to a suitable substrate, then heated to within a critical temperature range, food soils, commonly spattered on an oven liner during baking or broiling, are readily and completely oxidized to a fine ash residue which is easily removable from the oven enclosure.

Whereas, heretofore, self-cleaning ovens were found generally in electric ranges, the enamel of this invention provides a means for making gas ranges self-cleaning. That is, an electric range is, by design, capable of having self-cleaning portions thereof heated to high oxidation temperatures directly by elements placed along the reverse surfaces of the surfaces to be cleaned. A gas oven, on the other hand, could not be readily or practically designed so as to controllably elevate self-cleaning oven walls to oxidation temperatures by placing gas jets along the reverse surfaces thereof.

Accordingly, in order to effectively achieve a self-cleaning gas oven, it is essential that the interior, operating surface thereof be such that it will function at relatively low oxidation temperatures, and be capable of being brought up to those temperatures within an ambient oven atmosphere, utilizing standard oven baking or broiling burners conventionally positioned.

DESCRIPTION OF THE INVENTION

It is well known that an increase in oxygen in an atmosphere effectively reduces the temperature at which materials are oxidized. This is particularly noted when organic materials are exposed to atmospheres having a high percentage of oxygen. I have found that certain porcelain enamels produced from frits (glass), effectively supply oxygen when organic materials, such as food soils, are in contact with the enamel surface, and that oxygen from a normal atmosphere is absorbed by the coating, which, it is theorized, is either stored or diffused throughout the enamel coating, thereby making available sufficient excess oxygen to promote the oxidation of food soils when the coating is subsequently heated in accordance with this invention.

This oxygen absorption phenomenon seems to occur at about the same surface temperature as needed for oxidation of an organic soil material contacting the surface, and is greatly enhanced by the presence within, and homogeneously smelted throughout, the enamel frit, of certain oxidation-inducing metal oxides, such as, but not limited to, cobalt oxide.

At this point, a review of U.S. Pat. No. 3,266,477 to Stiles will aid materially in an appreciation of the unexpected and startling results of the instant invention.

Stiles teaches the use of a number of catalyst materials dispersed on oven surfaces via a number of different media for the purpose of aiding in the oxidation of oven soils.

From the general teaching of Stiles, it will be apparent that it is critical to his invention that his catalyst materials be thinly distributed on the oven surface.

One of the methods by which Stiles achieves a thin distribution of his catalyst on an oven liner is by sticking same to the surface thereof, Stiles quite emphatically stating, at the bottom of Column 2, lines 70—72 that, although he may distribute his catalyst material on the surface of an enamel coating and reheat the coating in order to "partially" embed his catalyst in the ceramic layer, that the catalyst should not be so deeply embedded as to obstruct access to his surface-distributed catalyst. See also Column 5, lines 25 et seq. wherein Stiles again stresses that it is absolutely essential that his catalyst particles do not become too deeply embedded in the enamel coating as cleaning inactivity would result.

Examples 4, and 10—18 inclusive of Stiles are specific embodiments of the utilization of a porcelain enamel as a base for Stiles' catalytic particles. Attention is particularly directed to the number of complex steps in each operation in order to achieve a workable catalytic surface layer on porcelain enamel.

By the very nature of Stiles' exposed catalytic layer the so-called catalytic particles of Stiles are highly susceptible to being removed by abrasion, thereby materially reducing their effectiveness after a period of time in use.

However, applicant has found, surprisingly, and directly contrary to the teachings of Stiles, that a totally unexpected improvement is achieved by incorporating high levels of certain oxidation-inducing metal oxides in the frit by smelting same homogeneously into and throughout the fritted, glass matrix, which is later milled into a porcelain enamel and applied to an oven liner, requiring only Step 1 of Stiles' enamel examples, thereby enabling me to completely eliminate Steps 2—5 of Stiles' Examples 4, and 11—18 inclusive, and Steps 2—6 inclusive of Stiles' Example 10.

Too, by incorporating my oxidation-inducing metal oxide into the glass matrix of my frit, it becomes fixed throughout the enamel coating in such a permanent manner that no amount of abrasion can ever remove it. That is, should the enamel coating wear or abrade with use, the homogeneous dispersion of oxidation-inducing metal oxide throughout the entire enamel coating insures that there will always be readily available, at or near the surface of the coating, a supply of oxidation-inducing metal oxide for oxidation of food soils.

Both the foregoing major advantages are achieved by virtue of the unexpected improvement, contrary to the teaching of the art, of literally melting and completely submerging the oxidation-inducing metal oxide into and homogeneously throughout the matrix of the glass frit, the basic component of a porcelain enamel oven coating.

Another advantage of incorporating my oxidation-inducing oxides directly into the frit is that, since the oxide is going to be melted directly into the glass, highly refined grades thereof are not required, standard ceramic grade sufficing nicely.

Previously, vegetable oil spatters on an oven surface normally required temperatures of 800° F. to effectively oxidize them. The glass, porcelain enamel, or glaze made according to this invention will effectively oxidize and remove spatters at 500° F. with the time of exposure to heat being the same as previously required for oxidation at 800° F. Oxidation at lower temperatures approaching 350° F. can be achieved with the frits of this invention, but occurs at a reduced rate.

SUMMARY

Briefly stated, this invention relates to a greatly improved frit and method of utilizing same for producing a porcelain enamel oven lining coating, the vitreous frit component of which contains a total of preferably 15 to 55 weight percent, but which may vary, depending upon frit characteristics from about 10 weight percent to about 79 weight percent of one or more of the following oxidation-inducing metal oxides:

cobalt oxide
manganese oxide
copper oxide
chromium oxide

Said frit is subsequently milled into a porcelain enamel slip for application to and firing on the metal substrate which forms a cooking oven liner.

The general boxlike structure of a cooking oven or broiler liner is so well known to the public that no graphic description of same is deemed necessary, and these are generally made of steel coated with porcelain enamel. However, as it is well known that porcelain enamel may be applied to any number of metallic substrates such as aluminum, stainless steel, etc., it is therefore within the realm of this invention to have an oven liner produced of any metal capable of withstanding cooking oven temperatures, subsequently coated with an enamel containing the frit of this invention.

DESCRIPTION

In the practice of my invention, an enamel frit is batch weighed, mixed, smelted and quenched into flake or frit utilizing conventional batch materials and procedures, except for the novel amounts of contained oxidation-inducing metal oxides as hereinafter described.

As will be developed infra, the base composition of the frit, aside from the contained oxidation-inducing metal oxide, which is useful to the practice of this invention is not considered critical, and it is required only that the frit, when smelted with a given percentage of oxidation-inducing metal oxide, be of such a fusability, and have the required physical characteristics, to be adaptable to be applied to a metallic substrate and fired into an adherent, porcelain enamel coating having preferably a matte to semimatte surface.

The terms "matte" and "semimatte" are well known in the art of porcelain enameling, and no detailed, quantitative description thereof is deemed necessary, although, in the interest of precision and a ready understanding of the specification and claims, both "matte" and "semimatte," refer to a surface demonstrating a 45° specular gloss value of less than 5, using a Photovolt Corporation glossmeter model 610, following ASTM Standard Method of Test for 45° Specular Gloss of Ceramic Materials, with the preferred value being about 3 or less.

And, although composition as such is not important, below in Table I is listed, for general guidance, the oxide components which could go to make up any given frit useful to this invention, demonstrating a general range of each component by weight percent, it being understood that, as the weight percentage varies for the components of any given frit within the indicated range, they would total 100.

Furthermore, one or more of the listed components may be completely eliminated in a given frit, or other well known oxides, although not listed below, may be added for various special purposes.

TABLE I.—FRIT OXIDE COMPOSITION PARTS BY WEIGHT

| | Wt./percent |
| --- | --- |
| BaO | 0–20 |
| $B_2O_3$ | 0–30 |
| CaO | 0–30 |
| $K_2O$ | 0–20 |
| $Li_2O$ | 0–15 |
| $Na_2O$ | 0–20 |
| $P_2O_5$ | 0–20 |
| $Sb_2O_3$ | 0–30 |
| $SiO_2$ | 10–60 |
| $TiO_2$ | 0–30 |
| ZnO | 0–20 |
| $F_2$* | 0–10 |
| Oxidation inducing metal** oxides | 10–79 |

NOTE.—The foregoing components totalling 100 as they vary within the ranges indicated.
*$F_2$ computed as replacing $O_2$ in the above composition.
**Cobalt, manganese, copper or chromium.

The oxidation-inducing metal oxides may be any one or any combination of the oxides of copper, cobalt, manganese and to a limited extent chromium. The quantity of the oxidation-inducing metal oxides used is dependent upon the other elements that make up the glass only to the degree that higher levels of oxidation-inducing metal oxides might vary the fusability of a given glass, and thereby alter its workability characteristics, requiring appropriate adjustment of the amount of oxidation-inducing metal oxides within their workable range.

Of the foregoing oxidation-inducing metal oxides, all will function to provide soil oxidation characteristics in the practice of this invention either singly or in combination with the others.

Chromium however, in order to be effective, must be accompanied in the vitreous composition by at least one or the other three oxidation-inducing metal oxides, if the equivalent of the 3½-minute firing cycle as hereinafter set forth is utilized. On the other hand, in order for chromium to function singly as the sole oxidation-inducing oxide, either a longer firing cycle will be required (for example the equivalent of a 5-minute firing cycle as compared to a 3½-minute firing cycle hereinafter set forth), or fired at a temperature of from 50° to 100° F. higher than the temperatures hereinafter set forth, at the equivalent of a 3½-minute firing cycle, for a given frit.

Thus, for example, a vitreous enamel containing 5 weight percent cobalt oxide and 30 weight percent chromium oxide will, in accordance with the following testing procedures, provide far superior soil oxidation qualities than either a glass containing only 5 weight percent of cobalt oxide, or 35 weight percent chromium oxide as a soil oxidation-inducing metal oxide, if the normal firing cycle and temperature are employed.

But in the absence of at least 5 percent cobalt, manganese or copper, then a frit containing chromium as the sole oxidation-inducing oxide must be given a slightly greater heat treatment, either as to time or temperature, as set forth above, in order to provide the beneficial results of this invention.

And, as stated above, although our preferred range of oxidation-inducing metal oxides is on the order of 15 to 55 weight percent of the frit, either singly or in combination, some recognizable, measurable oxidation properties can be achieved at as low as 10 weight percent, and as high as 70 weight percent, depending upon the given characteristics of a given frit such as fusability, etc.

It is to be understood that there is no measurable upper limit of the oxidation-inducing oxide, the only requirement being that there be enough other glass forming components to provide a glass which is workable and has the general qualities of a porcelain enamel at conventional firing temperatures.

Exemplary of specific vitreous enamel compositions useful in the practice of this invention are the following specific working examples.

EXAMPLE 1

The following composition was weighed and mixed in a suitable raw batch mixer, or blender.

| | Parts by Wt. |
| --- | --- |
| Borax | 135 |
| Soda Ash | 243 |
| Potassium Carbonate | 238 |
| Barium Carbonate | 66 |
| Manganese Dioxide | 737 |
| Calcium Carbonate | 24 |
| Lithium Carbonate | 60 |
| Silica | 1,000 |
| Zinc Oxide | 119 |
| Sodium Tripoly Phosphate | 29 |
| Antimony Oxide | 203 |
| Titanium | 245 |

The foregoing mixture was then smelted at 2,350° F., quenched (fritted) in cold water, and dried in a drier at 200° F., the resultant frit having the following oxide weight percent composition:

| Oxide: | Weight percent |
| --- | --- |
| $B_2O_3$ | 3.1 |
| $Na_2O$ | 6.8 |
| $SiO_2$ | 35.2 |
| $K_2O$ | 5.6 |
| BaO | 1.8 |
| $MnO_2$ | 25.7 |
| CaO | .5 |
| $Li_2O$ | .8 |
| ZnO | 4.2 |
| $P_2O_5$ | .6 |
| $TiO_2$ | 8.6 |
| $Sb_2O_5$ | 7.1 |

The resulting frit was then milled in a conventional ball mill using the following mill addition:

| | Weight percent |
|---|---|
| Glass (frit) | 100 |
| Polytran FS* | ½ |
| NaNO₂ | ½ |
| Water | 45 |

*Polytran FS is a water-soluble bio-polymer composition containing scleroglucan, a high molecular weight polysaccharide produced by fermentation. The polymer structure is substantially a linear chain of anhydroglucose units linked beta 1–3. Thirty to thirty-five percent of the linear chain units bear single appended anhydroglucose units linked beta 1–6.

This enamel was milled to a fineness of 10 grams/400 mesh/50 cc., then sprayed on a suitably prepared substrate at an application weight of 30 gms/sq. ft. The enamel was then fired at 1,450° F. for 3 minutes to a matte surface, and the enamels of this invention will normally be fired at temperatures lower than 1,600° F.

The foregoing mill addition is, as will be readily apparent, considered to be "clayless," and is applicable to either a ground coated metallic substrate, or by a direct-on process, to suitably prepared metal substrate.

The frit containing the oxidation-inducing metal oxide above was compared to a similar frit which contained no such oxide, as well as to a conventional oven enamel in the following test. In this and all subsequent examples, the standard of comparison was a blank enamel having substantially the same composition as that enamel of this invention being evaluated, except for the oxidation-inducing metal oxide, along with a conventional oven enamel found in oven ranges heretofore, and which contained no oxidation-inducing metal oxides at the level utilized in the frit of this invention.

This and the following examples were evaluated by heating to 390° F., at which temperature one drop each of various types of food soils (shortening, meat renderings and sugar water) was placed on the hot sample with an eyedropper. The test samples were then heated at 550° F. for 2 hours.

At the end of this 2-hour period the samples were cooled and evaluated. The coating of this invention which the manganese dioxide smelted in had left no residual stain, while the two comparison standards containing no oxidation-inducing metal oxides, had a tightly adhering, unsightly black residue where the food samples had been placed.

EXAMPLE 2

The following composition was weighed and mixed in a blender.

| | Parts by Wt. |
|---|---|
| Soda Ash | 400 |
| Sodium Nitrate | 137 |
| Cobalt Oxide | 1,000 |
| Calcium Carbonate | 1,030 |
| Quartz | 1,036 |
| Zinc Oxide | 226 |

The foregoing mixture was then smelted at 2,350° F., quenched (fritted) in cold water, and dried in a drier at 200° F., the resultant frit having the following oxide weight percent composition:

| Oxide: | Weight percent |
|---|---|
| $Na_2O$ | 9.4 |
| CaO | 18.0 |
| $SiO_2$ | 33.2 |
| ZnO | 7.3 |
| CoO | 32.1 |

The frit was milled in a conventional ball mill using the following clayless mill addition:

| | Wt. percent |
|---|---|
| Glass (frit) | 100 |
| Polytran FS | ½ |
| NaNO₂ | ½ |
| Water | 45 |

This enamel was milled to a fineness of 10 grams/400 mesh/50 cc., and sprayed on a suitable substrate at an application weight of 30 gms/sq. ft. The enamel was then fired at 1,400° F. for 3 minutes to obtain a matte surface.

The foregoing frit was evaluated to a blank standard, and a conventional oven enamel according to the procedures of Example 1. At the end of this 2-hour test period the samples were cooled and compared. The glass with the smelted-in cobalt had no residual stain, while the sample of a conventional enamel, and the standard minus cobalt had a tightly adhering black residue.

EXAMPLE 3

A glass with the following raw batch composition was batch weighed and mixed in a blender:

| | Parts by Wt. |
|---|---|
| Soda Ash | 543 |
| Sodium Nitrate | 79 |
| Potassium Carbonate | 97 |
| Barium Carbonate | 131 |
| Cobalt Oxide | 1,000 |
| Lithium Carbonate | 138 |
| Silica | 629 |
| Titania | 318 |
| Litharge | 821 |
| Antimony Oxide | 64 |

The mixture was then smelted at 2,200° F. for 40 minutes, quenched in cold water and dried in a drier at 200° F., the resultant frit having the following oxide weight percent composition:

| Oxide: | Weight percent |
|---|---|
| $Na_2O$ | 10.1 |
| $K_2O$ | 1.9 |
| $TiO_2$ | 9.4 |
| $Li_2O$ | 1.6 |
| BaO | 2.9 |
| PbO | 24.2 |
| $Sb_2O_5$ | 1.9 |
| $SiO_2$ | 18.5 |
| $Co_2O_3$ | 29.5 |

The frit was then milled in a conventional ball mill using the following mill addition:

| | Wt. percent |
|---|---|
| Glass (frit) | 100 |
| Clay | 4 |
| Bentonite | ⅜ |
| $K_2CO_3$ | ⅛ |
| Keltex* | ¹⁄₁₆ |
| Alumina | 20 |
| Water | 55 |

*An alginate manufactured by the Kelco Co., similar in function to gum tragacanth.

This enamel was milled to a fineness of 10 grams/400 mesh/50 cc., then sprayed on a suitably prepared substrate at an application weight of 30 gms/sq. ft., then fired at 1,450° F. for 3 minutes to obtain a matte surface.

As stated above, it is desirable that the enamels of this invention, to be most effective, have either a matte or semimatte sheen, or surface, and the frits of Examples 1 and 2 were of the so-called, "selfmatting" type. The frit of Example 3, on the other hand, would normally fire out to a relatively high gloss and the inclusion of 20 weight percent alumina in the mill addition had the effect of promoting in the final enamel coating the required degree of matteness.

The samples were evaluated following the same procedure as in Example 1. At the end of the 2-hour test period the samples were cooled and evaluated. The glass with the smelted-in cobalt had no residual stain, while samples of the conventional enamel and the blank standard had tightly adhering black residues where the food samples had been applied.

EXAMPLE 4

To demonstrate that a relatively simple glass is adaptable to the practice of this invention, the following composition was weighed and mixed in a blender:

| | Parts by Wt. |
|---|---|
| Barium Carbonate | 520 |
| Cobalt Oxide | 1,328 |
| Boric Acid | 730 |

This glass was then smelted at 2,500° F. for 50 minutes, quenched in cold water and dried in a drier at 200° F., the resultant frit having the following oxide weight percent composition:

| Oxide: | Weight percent |
|---|---|
| BaO | 18 |
| $B_2O_3$ | 19 |
| CoO | 63 |

The frit was then milled in a conventional ball mill using the following mill addition:

| | Wt. percent |
|---|---|
| Glass (frit) | 100 |
| Polytran FS | ½ |
| $NaNO_2$ | ½ |
| Water | 45 |

This enamel was milled to a fineness of 10 grams/400 mesh/50 cc., then sprayed on a suitably prepared substrate at an application weight of 30 gms/sq. ft., then fired at 1,500° F. for 2 minutes to obtain a matte surface.

These samples were evaluated using the same procedure as in Example 1. After the cleaning cycle the glass with smelted-in cobalt oxide was substantially free of residual stain, while samples of conventional enamel and the blank standard had a tightly adhering black deposit.

EXAMPLE 5

A matting glass with the following composition was weighed and mixed in a blender.

| | Parts by Wt. |
|---|---|
| Borax | 135 |
| Soda Ash | 192 |
| Potassium Carbonate | 238 |
| Barium Carbonate | 66 |
| Manganese Dioxide | 280 |
| Potters Whiting | 24 |
| Lithium Carbonate | 60 |
| Powdered Quartz | 1,000 |
| Zinc Oxide | 119 |
| Sodium Tripoly Phosphate | 100 |
| Antimony Oxide | 203 |
| Titanium | 245 |

The mixture was then smelted at 2,350° F. for 40 minutes, quenched in cold water and dried in a drier at 200° F., the resultant frit having the following oxide weight percent composition:

| Oxide: | Weight percent |
|---|---|
| $B_2O_3$ | 3.63 |
| $Na_2O$ | 8.01 |
| $K_2O$ | 6.64 |
| BaO | 2.10 |
| CaO | 0.54 |
| $Li_2O$ | 0.99 |
| $MnO_2$ | 10.00 |
| $P_2O_5$ | 2.38 |
| $SiO_2$ | 41.37 |
| $TiO_2$ | 10.13 |
| ZnO | 4.90 |
| $Sb_2O_5$ | 9.31 |

The frit was then milled in a conventional ball mill using the following mill addition:

| | Wt. percent |
|---|---|
| Glass (frit) | 100 |
| Polytran FS | ½ |
| $NaNO_2$ | ½ |
| Water | 45 |

This enamel was milled to a fineness of 10 grams/400 mesh/50 cc., then sprayed on a suitable prepared substrate at an application weight of 30 gms/sq. ft., then fired at 1,400° F. for 3 minutes to obtain a matte surface.

The samples were evaluated following the same procedure as in Example 1. At the end of the 2-hour test period the samples were cooled and evaluated. The glass with 10 percent manganese smelted in had left no residual stain while a sample of a conventional enamel had a tightly adhering black deposit.

As stated above, the composition of the frits useful to this invention is not overly critical and this fact will be supported by setting forth in Table II below the ranges of various oxide components spanned by Examples 1—5.

TABLE II.—FRIT OXIDE COMPOSITION PARTS BY WEIGHT

| | Wt./percent |
|---|---|
| BaO | 0–18 |
| $B_2O_3$ | 0–19 |
| CaO | 0–18 |
| $K_2O$ | 0–7 |
| $Li_2O$ | 0–2 |
| $Na_2O$ | 0–10 |
| $P_2O_5$ | 0–3 |
| $Sb_2O_5$ | 0–10 |
| $SiO_2$ | 0–42 |
| $TiO_2$ | 0–10 |
| ZnO | 0–8 |
| PbO | 0–24 |
| Oxidation-inducing metal* oxides | 10–63 |

Note.—The foregoing components totalling 100 as they vary within the ranges indicated.

*Cobalt, manganese, copper or chromium.

While I have demonstrated a utility for this class of vitreous coatings in connection with self-cleaning cooking ovens, it is to be understood that the ability of a vitreous coating such as mine to oxidize organic compounds would also have wide application in a number of different fields, for example, utilization of my enamel in connection with exhaust systems for paint baking ovens whereby the vapors, prior to being discharged into the open atmosphere, would be exposed to a series of heated surfaces covered with my porcelain enamel and thereby oxidized to unobjectionable compounds from the standpoint of air pollution. The same theory would apply to automotive exhaust systems, the interiors of which could be coated with my enamel to render certain products of combustion less noxious and objectionable prior to their discharge into the atmosphere.

The ability of these coatings to oxidize organics is a function of time, temperature and the type of organic to be oxidized. Generally little or no effective oxidation can be achieved below a temperature of 350° F. It is contemplated that the upper temperature limit of oxidation utilizing my coating would be in the vicinity of 600° F. This providing the added advantage that extensive safety and locking devices are not considered necessary at this temperature, inasmuch as the likelihood of an explosion resulting from the sudden availability of excess oxygen due to inadvertent opening of the oven door is considered to be materially reduced within this range whereas, at the higher temperatures required for previous methods of heat oxidation of oven soils, there was always the ever-present danger of such explosion, requiring the inclusion in the appliance of a safety locking device for the oven door, to be utilized during the oxidation process.

From the foregoing working examples, except as the percentage of oxidation-inducing oxide in the frit may be reduced by mill added components, such as alumina in Example 4, the weight percent of the oxidation-inducing oxide will occur in the final, fired, enamel coating in substantially the same weight percent as in the frit.

Having thus described and illustrated my invention, it is set forth in the following claims which are to be construed in the light of the United States statutes and decisions in such a manner as to give them the broad range of equivalents to which they are entitled.

I claim:

1. A metallic cooking oven liner having fused to its operating surface at a temperature less than 1,600° F., a porcelain enamel coating, having a matte to semimatte surface, said coating composed of a frit having had smelted homogeneously therethroughout at least one oxidation-inducing oxide selected from the group consisting of Co, Mn, Cu and Cr in an amount, singly or in combination, or from about 10 to 70 weight percent of said coating.

2. The oven of claim 1 wherein the total of said oxidation-inducing oxides is in said coating in from about 15 to about 55 weight percent.

3. A metallic cooking oven liner having fused to its operating surface at a temperature less than 1,600° F., a porcelain enamel coating adaptable to oxidize organic soils thereon when heated to a temperature of from about 350° F. to about 600° F., said coating composed of a frit characterized by having had smelted homogeneously therethroughout at least one oxidation-inducing oxide selected from the group consisting of Co, Mn, Cu and Cr in an amount, singly or in combination, of from about 10 to 70 weight percent of said frit.

4. The oven of claim 3 wherein the total of said oxidation-inducing oxides is in said frit in from about 15 to about 55 weight percent.

5. A metallic cooking oven liner having fused to its operating surface at a temperature less than 1,600° F. a porcelain enamel coating adaptable to oxidize organic soils thereon when heated to a temperature of from about 350° F. to about 600° F., said coating composed of a frit characterized by having had smelted homogeneously therethroughout at least one oxidation-inducing oxide selected from the group consisting of Co, Mn and Cu, and additionally the oxidation-inducing oxide Cr, the total combined amount of oxidation-inducing oxides ranging from about 10 to about 70 weight percent of said frit, the weight percent of said Co, Mn and Cu, singly or in combination, being at least 5 weight percent of said frit.

6. The oven liner of claim 5 wherein the total of said oxidation-inducing oxides is in said frit in from about 15 to about 55 weight percent.

7. The oven of claim 3 wherein the total of said oxidation-inducing oxides which had been smelted into said frit were present therein in from about 15 to about 55 weight percent, and said porcelain enamel coating has a matte to semimatte surface.

8. The oven of claim 5 wherein the total of said oxidation-inducing oxides, which had been smelted into said frit, were present therein in from about 15 to about 55 weight percent, and said porcelain enamel coating has a matte to semimatte surface.

9. A metallic cooking oven liner having fused to its operating surface at a temperature less than 1,600° F. a porcelain enamel coating adaptable to oxidize organic soils thereon when heated to a temperature of from about 350° F. to about 600° F., said coating composed of a frit characterized by having had smelted homogeneously therethroughout at least one oxidation-inducing oxide selected from the group consisting of Co, Mn, Cu and Cr in an amount, singly or in combination, of from about 10 to 70 weight percent of said frit, the balance of said frit having had at least two additional oxides smelted therein selected from the following, and present within the range of each respectively:

| | Wt./percent |
|---|---|
| BaO | 0–20 |
| $B_2O_3$ | 0–30 |
| CaO | 0–30 |
| $K_2O$ | 0–20 |
| $Li_2O$ | 0–15 |
| $Na_2O$ | 0–20 |
| $P_2O_5$ | 0–20 |
| $Sb_2O_5$ | 0–30 |
| $SiO_2$ | 10–60 |
| $TiO_2$ | 0–30 |
| ZnO | 0–20 |
| $F_2$ | 0–10 |

10. The oven of claim 9 wherein the total of said oxidation-inducing oxides is in said frit in from about 15 to about 55 weight percent.

11. A metallic cooking oven liner having fused to its operating surface at a temperature less than 1,600° F. a porcelain enamel coating adaptable to oxidize organic soils thereon when heated to a temperature of from about 350° F. to about 600° F., said coating composed of a frit characterized by having had smelted homogeneously therethroughout at least one oxidation-inducing oxide selected from the group consisting of Co, Mn and Cu, and additionally the oxidation-inducing oxide Cr, the total combined amount of oxidation-inducing oxides ranging from about 10 to about 70 weight percent of said frit, the weight percent of said Co, Mn and Cu, singly or in combination, being at least 5 weight percent of said frit, the balance of said frit having had at least two additional oxides smelted therein selected from the following, and present within the range of each respectively:

| | Wt./percent |
|---|---|
| BaO | 0–20 |
| $B_2O_3$ | 0–30 |
| CaO | 0–30 |
| $K_2O$ | 0–20 |
| $Li_2O$ | 0–15 |
| $Na_2O$ | 0–20 |
| $P_2O_5$ | 0–20 |
| $Sb_2O_5$ | 0–30 |
| $SiO_2$ | 10–60 |
| $TiO_2$ | 0–30 |
| ZnO | 0–20 |
| $F_2$ | 0–10 |

12. The oven liner of claim 11 wherein the total of said oxidation-inducing oxides is in said frit in from about 15 to about 55 weight percent.

13. The oven of claim 9 wherein the total of said oxidation-inducing oxides which had been smelted into said frit were present therein in from about 15 to about 55 weight percent, and said porcelain enamel coating has a matte to semimatte surface.

14. The oven of claim 11 wherein the total of said oxidation-inducing oxides, which had been smelted into said frit, were present therein in from about 15 to about 55 weight percent, and said porcelain enamel coating has a matte to semimatte surface.